Oct. 24, 1972   U. LANDT ET AL   3,700,430
PROCESS FOR THE MANUFACTURE OF POTASSIUM
Filed May 27, 1970
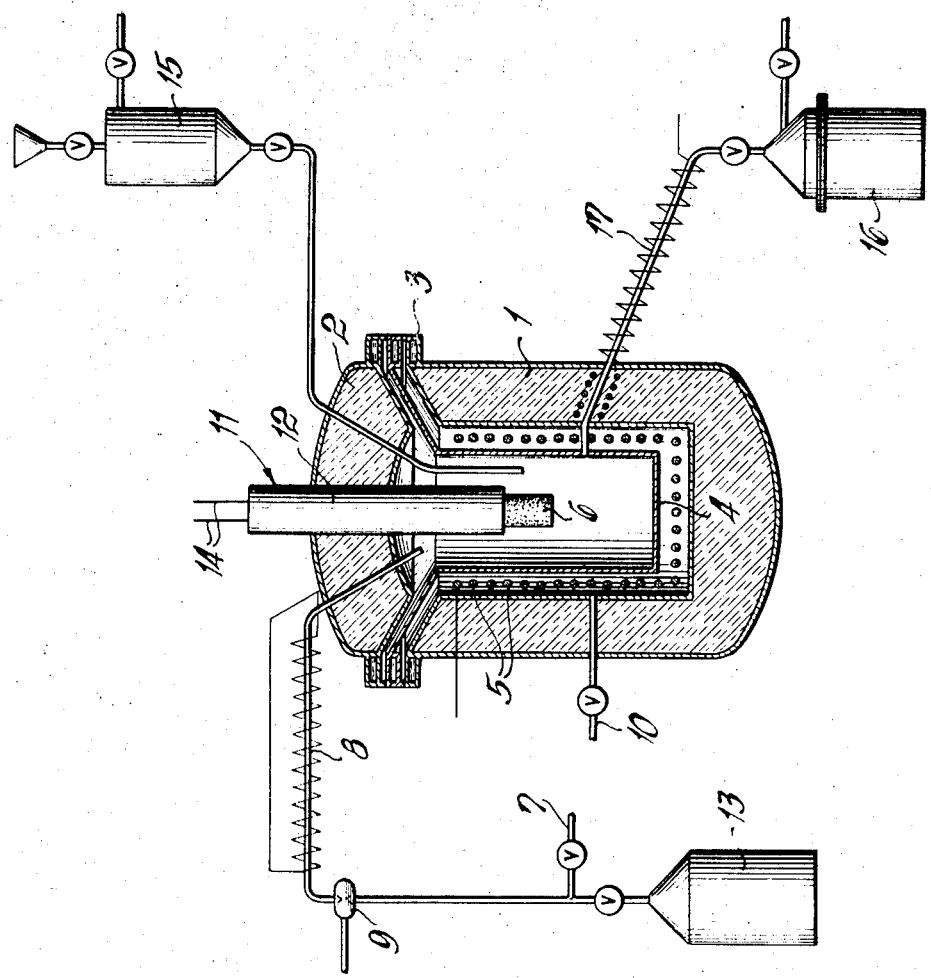

United States Patent Office 3,700,430
Patented Oct. 24, 1972

3,700,430
PROCESS FOR THE MANUFACTURE OF POTASSIUM
Uwe Landt, Hurth, near Cologne, Helmut Seifert, Hermulheim, near Cologne, and Otto Bretschneider, Kirchzarten, Black Forest, Schwarzwald, Germany, assignors to Knapsack Aktiengesellschaft, Knapsack, near Cologne, Germany
Filed May 27, 1970, Ser. No. 41,016
Claims priority, application Germany, June 25, 1969, P 19 32 129.0
Int. Cl. C22b 27/00
U.S. Cl. 75—66
9 Claims

ABSTRACT OF THE DISCLOSURE

Production of metallic potassium. $K_2SO_4$ placed in a reactor is reduced by means of iron in the presence of CaO under reduced pressure and with supply of heat, and the resulting potassium, which distils over, is condensed.

---

The present invention relates to a process for the production of potassium by thermochemical means, and to an apparatus for use in carrying out the process.

Various processes for the thermochemical production of potassium have already been described. The feed materials used therein primarily include KF, KCl, $K_2CO_3$ and KOH, and the reductants include C, $CaC_2$, Si, Al, Mg or FeSi.

While the reduction of KF generally furnishes high yields of potassium, the fact remains that this is a commercially unattractive process in view of the relatively high price of potassium fluoride. The susceptibility to moisture of $CaC_2$, which therefore is difficult to handle, is a further disadvantage that handicaps the use of $CaC_2$ in the reduction of KF, which has already been tried commercially. Still further, it is impossible to operate in continuous fashion as the reaction produces compact solid material rather than a melt, and this solid material is difficult to remove from the reactor.

More recently, it has repeatedly been suggested that KCl be used for the production of potassium. However, the relatively high vapor pressure of KCl dictates the use of extensive and costly facilities to enable the potassium, which distils over, to be isolated from KCl. While the reduction of $K_2CO_3$ would appear to be a commercially attractive procedure with respect to production costs, the fact remains that this process has failed to gain interest because of the formation of potassium carbonyl during the reaction and the inherent risks of explosion. The use of KOH as a feed material also fails to have beneficial effects as its hygroscopicity has been found to considerably handicap the course of the reaction.

The present invention now unexpectedly provides a process for the production of pure potassium, which is free from the deficiencies reported above and more particularly combines the use of inexpensive feed materials with continuous operation.

The present process for the production of metallic potassium comprises more especially reducing $K_2SO_4$ in a reactor by means of iron in the presence of CaO under reduced pressure and with the supply of heat, distilling off resulting potassium and condensing it.

The process should conveniently be carried out while using between 1 and 3 mols CaO, preferably 2 mols CaO, per mol $K_2SO_4$, and at least 5 gram atoms iron, again per mol $K_2SO_4$, and at least 5 gram atoms iron, again per mol $K_2SO_4$.

The feed reactants should preferably be reduced at temperatures above 950° C. and under reduced pressure. The feed reactants are more preferably heated to temperatures of between 950 and 1300° C., advantageously between 1000 and 1150° C., under a pressure of between 0.01 and 1.0 mm. mercury, advantageously between 0.05 and 0.8 mm. mercury.

These high temperatures make it desirable for the outer wall of the reactor to be maintained under pressure conditions substantially the same as those which prevail inside the reactor.

Following termination of the reaction, the molten reaction products are delivered to an evacuated container, and fresh feed material coming from a further evacuated container is fed to the reactor.

While it has long been known that potassium can be produced by reduction of $K_2SO_4$ by means of iron, the fact remains that conventional processes produce material which is extremely viscous and almost solid at the reaction temperature.

It has now unexpectedly been found that the use of the feed reactants in combination with CaO in the proportions suggested hereinabove effects the formation of a melt that is flowable at the reaction temperature and therefore can be tapped off continuously.

The reaction occurs substantially in conformity with the following schematic equation:

$$K_2SO_4 + 5Fe \rightarrow 2K + 4FeO + FeS$$

The condensation of potassium in vapor form effects the formation of very pure metallic potassium. The reason for this is that contamination of the feed reactants is obviated in the process of the present invention.

The iron may be used in powder form or in the form of waste sheet iron, turnings or scrap iron.

The present invention also provides an apparatus for use in carrying out the present process. The chief requirements which such apparatus has to meet are fair unsusceptibility of the reactor to the attack of molten $K_2SO_4$ and resistance of the heating means firstly to the attack of molten $K_2SO_4$ and secondly to the attack of potassium in vapor form or liquid form.

An apparatus which satisfies the requirements substantially comprises a closed crucible receiving reaction material, at least one heat radiator positioned in the crucible at a place above the reaction material and an at least partially heatable conduit connecting the crucible to a condenser and a collector.

The crucible is further fitted with a junction line connecting its interior to a vacuum pump.

In accordance with a preferred feature of the present invention, the crucible is most advantageously a chromenickel-molybdenum steel crucible.

The heat radiator may comprise one or more electrically heated graphite elements, of which the power leads are arranged so as to project into the crucible and enveloped therein by a jacket comprising a graphite base portion and steel head portion.

The crucible is preferably arranged to be additionally surrounded by a furnace fitted with a heater and a junction line connecting it to a vacuum pump.

The crucible is further provided with a cover which receives the heat radiator and the heatable conduit and which is arranged to be connected in airtight fashion, preferably by means of a water-cooled flange, to the furnace.

The crucible base portion may be connected to a container for the removal of slag under vacuum, and the crucible head portion may be connected to a reservoir, preferably a vacuum lock, for the supply of reaction material under vacuum to the crucible, the said container being connected to the crucible by means of a heatable conduit.

The apparatus will now be described in greater detail with reference to the exemplary embodiment shown in the accompanying drawing.

As can be seen, furnace 1 and its cover 2 are connected together in airtight fashion by means of water-cooled flange 3. The two structural parts are lined with a high temperature-resistant tamping mass, for example $Al_2O_3$. The reactor is a Cr-Ni-Mo-steel crucible 4 (V4A steel= stainless steel) which is arranged to be surrounded by an electric resistance heating 5 comprising a pluraliy of conventional heating rods. The heating system enables the material which is to undergo reaction to be heated up to a temperature of substantially 800° C. By means of one or more graphite radiators 11, which are arranged to project into crucible 4, it is possible to very rapidly heat the reaction material to the necessary reaction temperature of more than 950° C.; in addition thereto, it is possible to rapidly correct the temperature. Heating element 11 may comprise, for example, a graphite tube 6 provided with helical slits, or a plurality of graphite rods.

Electric power is supplied through lead 14 surrounded by protecting jacket 12, of which the lower third is of graphite and the upper two thirds are of steel, because of the aggressiveness of condensed potassium towards graphite.

The reactor is evacuated via line 7; potassium in vapor form is suction-drawn through line 8 heated to a temperature of between 350 and 400° C. by means of a heating coil. Near the end of pipe 8, which is surrounded by air cooled 9, the potassium in vapor form is condensed and delivered in liquid phase to container 13. Junction line 10 is used to produce in the space left between the crucible and the tamping mass a vacuum substantially of the same order as that established in the reactor itself. This is done to have a crucible of satisfactory strength.

For continuous operation, the apparatus may be connected to valved containers 15 and 16, which firstly enable the reactor to be fed with feed material and secondly enable liquid slag to be tapped off through heated conduit 17, under vacuum or inert gas.

The following examples illustrate the process and apparatus of the present invention.

EXAMPLE 1

610 grams $K_2SO_4$, 390 grams CaO and 980 grams iron in powder form were mixed together and the resulting mixture was introduced into a reaction crucible of V4A-steel (stainless steel). The furnace was closed, evacuated and the crucible with the feed material therein was heated to a temperature of 800° C., by means of heating rods. The discharge pipe, through which potassium in vapor form was removed, was simultaneously heated to a temperature of 350° C. By means of the graphite heating elements, it was possible very rapidly to increase the temperature prevailing in the crucible to substantially 1000° C. The potassium commenced to distil off at a temperature of 1020° C. and under a pressure of 0.25 mm. mercury, measured in the crucible bottom portion; from 1060° C. upward until termination of the experiment, all the material present in the crucible was in the form of a melt. The potassium ceased to distil over after 3 hours at a final temperature of 1130° C. and under a pressure of 0.06 mm. mercury. The yield was 86%, based on the quantity of $K_2SO_4$ used.

EXAMPLE 2

610 grams $K_2SO_4$ and 390 grams CaO were mixed and introduced together with 980 grams waste sheet iron into a reactor the same as that used in Example 1. The reactor was evacuated and heated in the manner described in the preceding example. The reaction material commenced to partially pass into the liquid state at 1100° C. and 0.6 mm. mercury, and potassium began to distil over at 1120° C. and 0.4 mm. mercury. The reaction was complete after about 2½ hours at 1140° C. and under a pressure of 0.1 mm. mercury. The yield was 84%.

We claim:

1. In the process for manufacturing metallic potassium by reducing $K_2SO_4$ in a reactor by means of iron from a reaction mixture thereof under reduced pressure with supply of heat, distilling off the resulting potassium and condensing it, the improvement which comprises adding between 1 and 3 mols of CaO per mol $K_2SO_4$ to the reaction mixture to make the reaction mixture readily flowable at the reaction temperature without participating as a component in the reduction reaction whereby tapping of the residue including the CaO by flowing it out of the reactor is facilitated.

2. The process as claimed in claim 1, wherein 2 mols CaO are used per mol $K_2SO_4$.

3. The process as claimed in claim 1, wherein at least 5 gram atoms iron are used per mol $K_2SO_4$.

4. The process as claimed in claim 1 wherein the reducing step is carried out at temperatures higher than 950° C.

5. The process as claimed in claim 1, wherein the reducing step is carried out under a pressure of between 0.01 and 1.0 mm. mercury and at temperatures of between 950 and 1300° C.

6. The process as claimed in claim 5, wherein the reducing step is carried out under a pressure of between 0.05 and 0.8 mm. mercury.

7. The process as claimed in claim 5, wherein the reducing step is carried out at temperatures of between 1000 and 1150° C.

8. The process as claimed in claim 5, wherein the outer wall of the reactor is maintained under pressure conditions substantially the same as those which prevail inside the reactor.

9. The process as claimed in claim 5, wherein, following termination of the reaction, the molten reaction product is delivered to an evacuated container, and fresh feed material coming from a further evacuated container is supplied to the reactor.

References Cited

UNITED STATES PATENTS

| 2,200,906 | 5/1940 | Wood | 75—66 X |
| 2,983,599 | 5/1961 | Carpenter | 75—66 |
| 2,971,833 | 2/1961 | Artru et al. | 75—67 |
| 2,893,862 | 7/1959 | Walaschewski et al. | 75—67 |
| 2,028,390 | 1/1936 | Hanson | 75—66 |
| 2,710,798 | 6/1955 | Hansley | 75—66 |

FOREIGN PATENTS

| 603,825 | 1926 | France | 75—66 |
| 1,098,539 | 1/1968 | Great Britain | 75—66 |
| 31,407 | 11/1920 | Norway | 75—66 |

HENRY W. TARRING II, Primary Examiner